US012619129B2

(12) United States Patent　　　(10) Patent No.:　US 12,619,129 B2
Chung et al.　　　　　　　　　　　(45) Date of Patent:　　　May 5, 2026

(54) CAMERA MODULE AND METHOD FOR ASSEMBLING THE SAME

(71) Applicant: ASUSTeK COMPUTER INC., Taipei City (TW)

(72) Inventors: Cheng-Han Chung, Taipei City (TW); Chen-Chuan Shieh, Taipei City (TW)

(73) Assignee: ASUSTeK COMPUTER INC., Taipei City (TW)

( * ) Notice: Subject to any disclaimer, the term of this patent is extended or adjusted under 35 U.S.C. 154(b) by 256 days.

(21) Appl. No.: 18/485,337

(22) Filed: Oct. 12, 2023

(65) Prior Publication Data

US 2024/0369911 A1　　Nov. 7, 2024

(30) Foreign Application Priority Data

May 5, 2023　(TW) ................................. 112116867

(51) Int. Cl.
*H04N 23/57*　　　(2023.01)
*G03B 17/08*　　　(2021.01)
*G03B 30/00*　　　(2021.01)

(52) U.S. Cl.
CPC ............. *G03B 17/08* (2013.01); *H04N 23/57* (2023.01); *G03B 30/00* (2021.01)

(58) Field of Classification Search
CPC ........ H04M 1/264; G03B 30/00; G04N 23/55
See application file for complete search history.

(56) References Cited

U.S. PATENT DOCUMENTS

| | | | | |
|---|---|---|---|---|
| 10,574,802 | B2 * | 2/2020 | Chen ..................... | G06F 1/1686 |
| 11,099,461 | B2 | 8/2021 | Ye et al. | |
| 11,165,894 | B2 * | 11/2021 | Li ........................... | H04B 1/08 |
| 11,397,373 | B2 | 7/2022 | Ye et al. | |
| 11,438,496 | B2 * | 9/2022 | Jung ................... | H04M 1/0264 |

FOREIGN PATENT DOCUMENTS

| | | |
|---|---|---|
| CN | 107544197 | 1/2018 |
| CN | 109836031 | 6/2019 |
| CN | 111722343 | 9/2020 |
| CN | 113867083 | 12/2021 |
| CN | 217046459 | 7/2022 |
| JP | 2011090057 A * | 5/2011 |

* cited by examiner

*Primary Examiner* — Leon W Rhodes, Jr.
(74) *Attorney, Agent, or Firm* — JCIPRNET

(57) ABSTRACT

A camera module includes a frame, a camera body, an appearance component, and a transparent cover. The frame includes a first opening. The camera body is disposed in the frame and includes a lens. The first opening corresponds to and exposes the lens. The appearance component is disposed on the frame and includes a second opening corresponding to and exposing the lens and a framing portion protruding from a top surface of the appearance component and framing the second opening. The transparent cover is engaged with the framing portion and covers the lens.

9 Claims, 8 Drawing Sheets

CAMERA MODULE AND METHOD FOR ASSEMBLING THE SAME

CROSS-REFERENCE TO RELATED APPLICATION

This application claims the priority benefit of Taiwan application serial no. 112116867, filed on May 5, 2023. The entirety of the above-mentioned patent application is hereby incorporated by reference herein and made a part of this specification.

BACKGROUND

Technical Field

The disclosure is related to a camera module and an assembly method thereof.

Description of Related Art

With the development of multimedia technology, digital cameras and video cameras are becoming more and more popular among consumers. People are increasingly pursuing the miniaturization of digital cameras and video cameras. At the same time, since portable electronic devices such as smart phones are thin, light, small, and easy to carry, people hope to have a camera module installed on their smartphones to enable the function of capturing object images and obtain clear pictures.

However, the heat generated during the operation of the camera module causes a temperature difference with the environment. In addition, the presence of moisture in the air can cause water droplets to condense and adhere to the lens inside the camera module. In addition, even if the water droplets evaporate after condensation, they can leave water marks on the lens, which may prevent the camera from capturing clear images and negatively impact its functionality. This can also harm the user's perception of the product. Moreover, the water droplets or water marks generated in this case cannot be solved by cleaning the lens externally because it occurs inside the lens. Therefore, how to address water droplets or water marks inside the camera module is a significant issue in the industry.

SUMMARY

The disclosure provides a camera module including a frame, a camera body, an appearance component, and a transparent cover. The frame includes a first opening. The camera body is disposed in the frame and includes a lens. The first opening corresponds to and exposes the lens. The appearance component is disposed on the frame and includes a second opening corresponding to and exposing the lens and a framing portion protruding from a top surface of the appearance component and framing the second opening. The transparent cover is engaged with the framing portion and covers the lens.

The disclosure further provides a method for assembling a camera module, which is described below. A camera body is disposed in a frame. The frame includes a first opening corresponding to and exposing a lens of the camera module. An appearance component is attached to the frame. The appearance component includes a second opening corresponding to and exposing the lens and a framing portion protruding from a top surface of the appearance component and framing the second opening to form an initial camera module. The initial camera module is placed in a non-aqueous airtight cavity. A transparent cover is attached to the appearance component in the non-aqueous airtight cavity to engage the transparent cover with in the framing portion and cover the lens.

Based on the above, the camera module and the assembly method thereof of the disclosure use elements such as a frame, an appearance component, and a waterproof adhesive layer to encapsulate the camera body in the frame and the appearance component. Under this configuration, external water and/or moisture may only enter the frame through the opening of the frame configured to expose the lens, as well as through the opening of the appearance component. Subsequently, the transparent cover is attached to the appearance component to seal the opening that exposing the lens. Moreover, the process of attaching the transparent cover is performed in the non-aqueous airtight cavity to prevent external water and/or moisture from entering the frame during assembly, thus effectively avoiding the problem of water droplets or water marks inside the camera module. Therefore, the camera module and the assembly method thereof of the disclosure may effectively improve the yield and the performance of the camera module.

DESCRIPTION OF THE EMBODIMENTS

Figure 1:
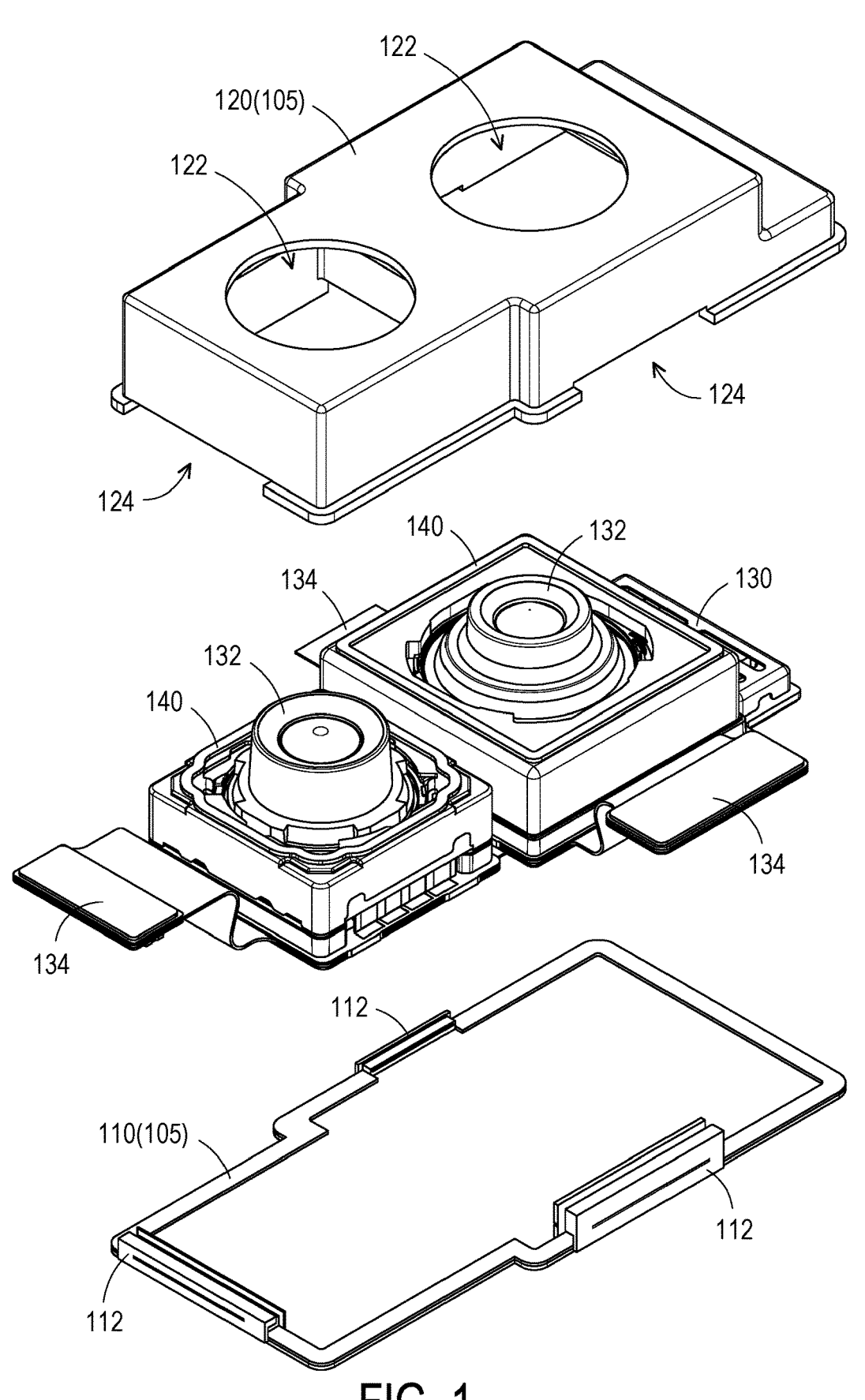
FIG. 1 is an exploded schematic view of a portion of elements of a camera module according to an embodiment of the disclosure.

The above and other technical contents, features and effects of the disclosure will be clear from the below detailed description of each of the embodiments of the disclosure with reference to accompanying drawings. The directional terms mentioned in the embodiments below, like "above", "below", "front", "back", "left", and "right", refer to the directions in the appended drawings. Therefore, the directional wordings are used to illustrate rather than limit the disclosure. Also, in the following embodiments, the same or similar components will be designated by the same or similar reference numerals.

Figure 2:
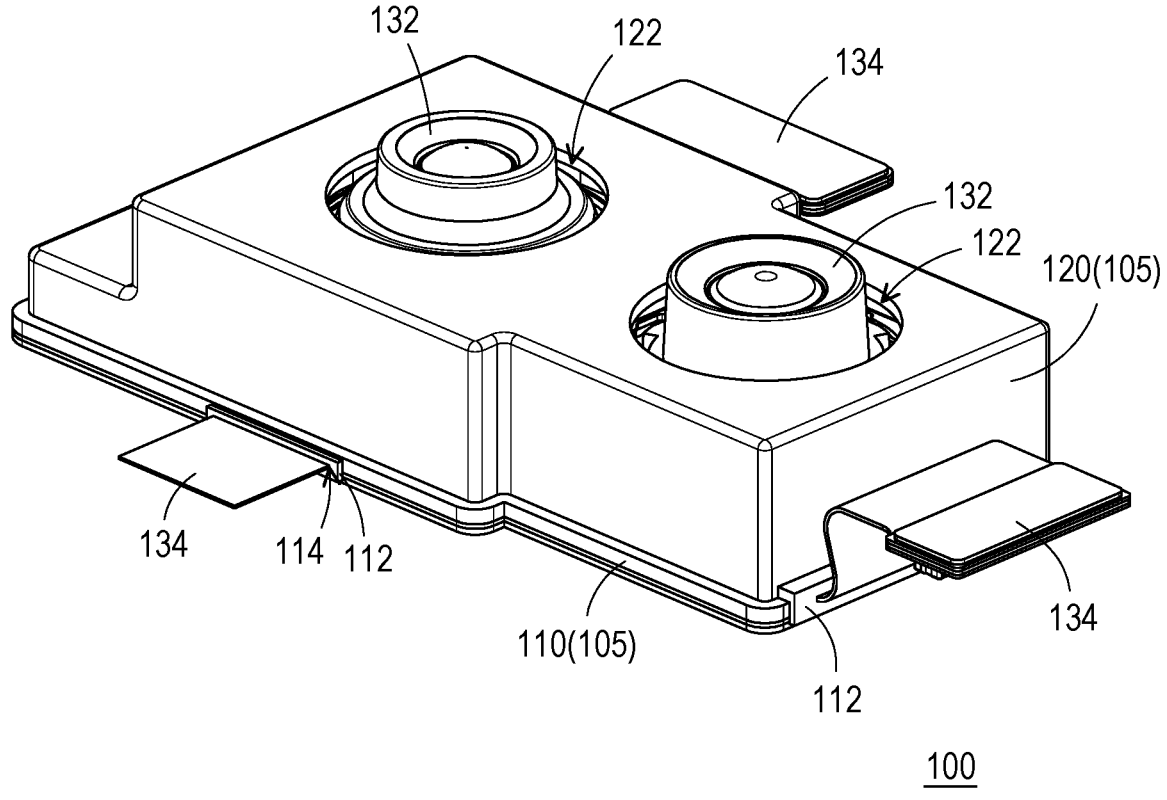
FIG. 2 is an assembly schematic view of a portion of elements of a camera module according to an embodiment of the disclosure.

Referring to FIG. 1 and FIG. 2, in some embodiments, a method for assembling a camera module may be described below. Firstly, a camera body 130 is disposed in a frame 105 to be assembled into a structure as shown in FIG. 2. In some embodiments, the camera body 130 may include at least one lens 132, and the frame 105 may include at least one first opening 122 corresponding to and exposing the lens 132 of the camera body 130. For example, in this embodiment, the camera body 130 includes two lenses 132, and the frame 105 may correspondingly include two first openings 122, which are respectively located above the lenses 132 to expose the corresponding lenses 132 respectively. Certainly, in other embodiments, the camera body 130 may be configured with fewer or more lenses 132, and one main lens may be included. Depending on product requirements, wide-angle lenses, ultra-wide-angle lenses, telephoto lenses, microscope lenses, black-and-white lenses, and any combination thereof may be used. Moreover, the number of the first opening 122 corresponds to the number of the lenses 132. In other embodiments, the lens 132 may also include other electronic components, such as a flash light, a small screen, or a distance sensor, and the disclosure is not limited thereto.

In one embodiment, the frame 105 may include a lower cover 110 and an upper cover 120 fixed to each other. The first opening 122 is disposed on the upper cover 120 to expose the lens 132. In this embodiment, a side wall of the upper cover 120 defines an accommodating groove to cover the camera body 130 therein, and may be used to fix the relative positions among the lenses 132 of the camera body 130. Specifically, a waterproof adhesive layer 140 may be coated on the top surface of the camera body 130 first. Then, the camera body 130 is covered by the upper cover 120 Afterwards, the fixed camera body 130 and the upper cover 120 are disposed on the lower cover 110, and the gap between the lower cover 110 and the upper cover 120 is sealed. Such a configuration may maintain a gap between the camera body 130 and the lower cover 110, thereby avoiding excessive pressure on the circuit board and optical sensor located at the bottom of the camera body 130 by the lower cover 110. In this embodiment, the waterproof adhesive layer 140 at least frames the lens 132 to fix the relative position between the lens 132 and the upper cover 120.

In an embodiment, the camera body 130 may include at least one connector 134, the frame 105 may include a connector opening 124 corresponding to the connector 134, so that the connector 134 may extend out of the frame 105 through the connector opening 124, so as to be electrically connected to an external electronic component (e.g., a circuit board, etc.). For example, in this embodiment, the camera body 130 includes three connectors 134, and the frame 105 may correspondingly include three connector openings 124 respectively corresponding to positions of the three connectors 134, so that the connectors 134 may extend out of the frame 105 through the connector openings 124 respectively. Certainly, in other embodiments, the camera body 130 may be configured with fewer or more connectors 134, and the amount of the connector opening 124 corresponds to the amount of the connector 134. In some embodiments, the connector 134 may include an electrical connector for electrically connecting the camera body 130 to electronic components outside of the frame 105 and/or a grounding connector for grounding the camera body 130. In this embodiment, the electrical connector may include a flexible circuit board, and the ground connector may include copper foil, but the disclosure is not limited thereto. In this embodiment, after covering the camera body 130 and the lower cover 110 with the upper cover 120, the connector 134 protrudes to the outside of the frame 105 through the connector opening 124. Then, the waterproof adhesive layer 112 is coated/disposed at the connector opening 124, so that the waterproof adhesive layer 112 at least frames the connector opening 124 to fill the gap between the connector opening 124 and the connector 134, so that the waterproof and sealing effect may be achieved. This prevents water and moisture from entering the frame 105 through the connector opening 124.

Figure 3:
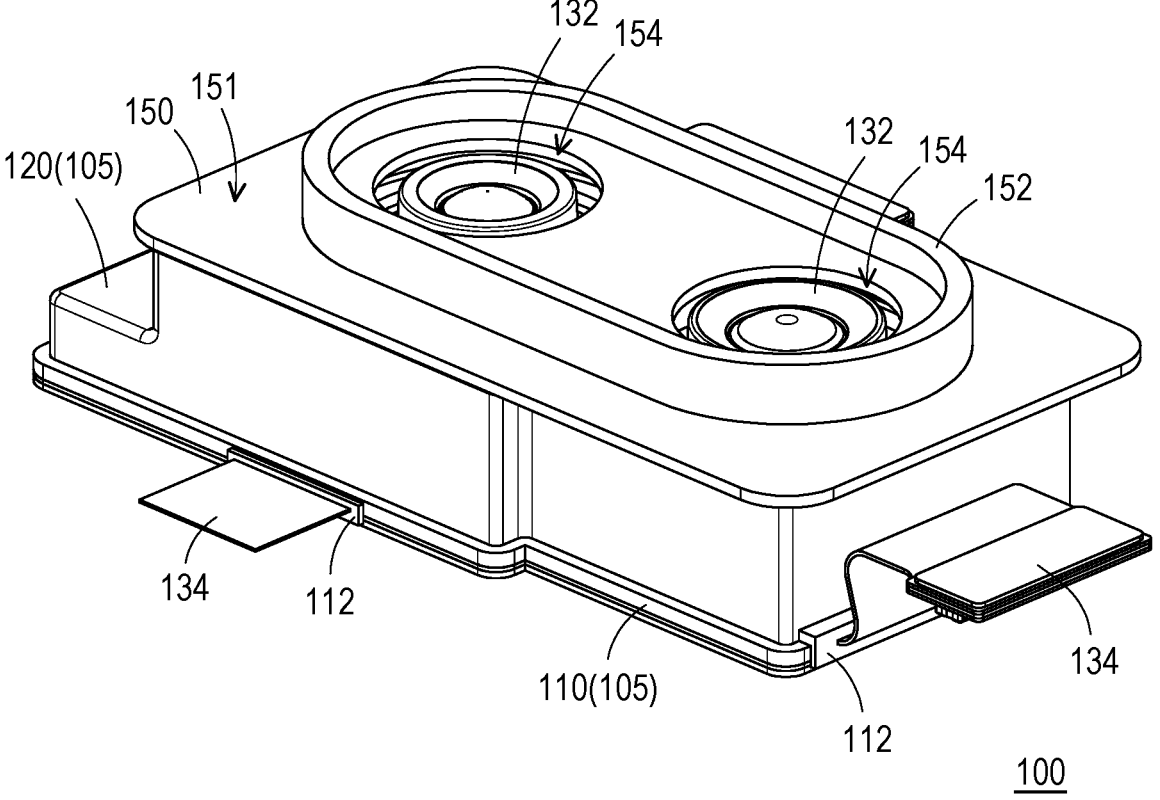
FIG. 3 is an assembly schematic view of a portion of elements of a camera module according to an embodiment of the disclosure.
Figure 5:
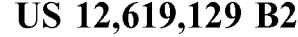
FIG. 5 is a cross-sectional schematic view of a camera module according to an embodiment of the disclosure.

Referring to FIG. 3 and FIG. 5, then, the appearance component 150 is attached/disposed on the frame 105 to form the initial camera module 101 as shown in FIG. 3. In some embodiments, the appearance component 150 is attached to the upper cover 120 of the frame 105, and the appearance component 150 includes a second opening 154 corresponding to and exposing the lens 132 and a framing portion 152 protruding from an top surface of the appearance component 150 and framing the second opening 154. In this embodiment, the camera body 130 includes two lenses 132, and the appearance component 150 may correspondingly include two second opening 154, which are respectively located above the lens 132 and corresponding to the first opening 122 of the frame 105, so as to expose the corresponding lenses 132 respectively. Certainly, in other embodiments, the camera body 130 may be configured with fewer or more lenses 132, and the amount of the second opening 154 corresponds to the amount of the lenses 132. In other embodiments, the lens 132 may also include other electronic components, such as a flash light, a small screen, or a distance sensor, and the disclosure is not limited thereto.

Specifically, the process of attaching the appearance component 150 to the frame 105 may include coating/disposing a waterproof adhesive layer 170 (e.g., the waterproof adhesive layer 170 shown in FIG. 5) on the top surface of the frame 105. Afterwards, the appearance component 150 is disposed on the frame 105, so that the waterproof adhesive layer 170 is located between the frame 105 and the appearance component 150, and the appearance component 150 is attached to the frame 105. In one embodiment, the waterproof adhesive layer 170 may frame at least a peripheral area of the frame 105 to ensure that the appearance component 150 is fully fixed on the frame 105.

Figure 4:
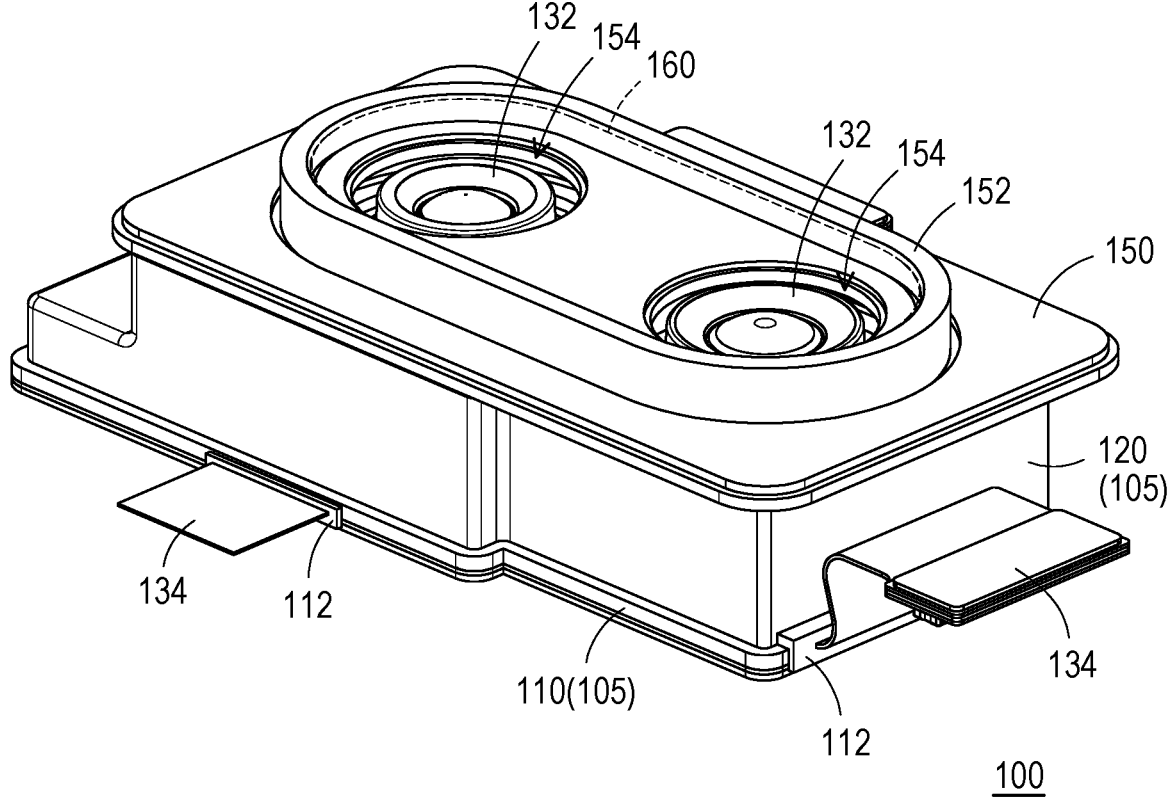
FIG. 4 is a perspective schematic view of a camera module according to an embodiment of the disclosure.

Referring to FIG. 4 and FIG. 5 at the same time, a transparent cover 160 is then attached to the appearance component 150 to engage the transparent cover 160 with in the framing portion and cover the lens 132. Specifically, the process of attaching the transparent cover 160 to the appearance component 150 may include coating/disposing a waterproof adhesive layer 180 on the top surface of the frame 150. Moreover, a gap between the framing portion 152 and the transparent cover 160 is filled by the waterproof adhesive layer 180 to attach the transparent cover 160 to the appearance component 150. In this embodiment, the waterproof adhesive layer 180 may be coated in a space framed by the framing portion 152. Specifically, the waterproof adhesive layer 180 may frame the peripheral area of the space framed by the framing portion 152, as shown in FIG. 5, and be coated in the region between the second openings 154. Then, the transparent cover 160 is attached to the appearance component 150 to cover the lens 132. At this point, the assembly of a camera module 100 is generally completed.

Figure 6:
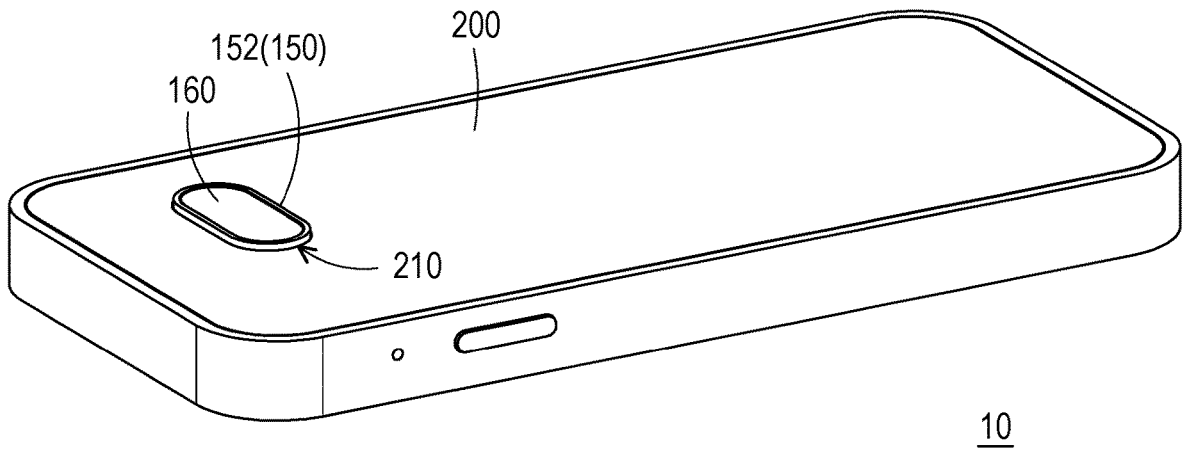
FIG. 6 is a schematic view of a camera module applied to a portable electronic device according to an embodiment of the disclosure.

Referring to FIG. 4 and FIG. 6, the camera module 100 may be applied to a portable electronic device 10. For example, the portable electronic device 10 may include a housing 200, and a surface (e.g., a rear surface) of the housing 200 may have a camera opening 210. The camera module 100 may be disposed in the housing 200, and the camera opening 210 of the housing 200 exposes the framing portion 152 of the appearance component 150 for framing the lens 132 and the transparent cover 160 covering the lens 132. In this embodiment, the top surface of the framing portion 152 may slightly protrude from the surface of the housing 200. Certainly, in other embodiments, the top surface of the framing portion 152 and the top surface of the transparent cover 160 may also be substantially coplanar with the surface of the housing 200.

Figure 7:
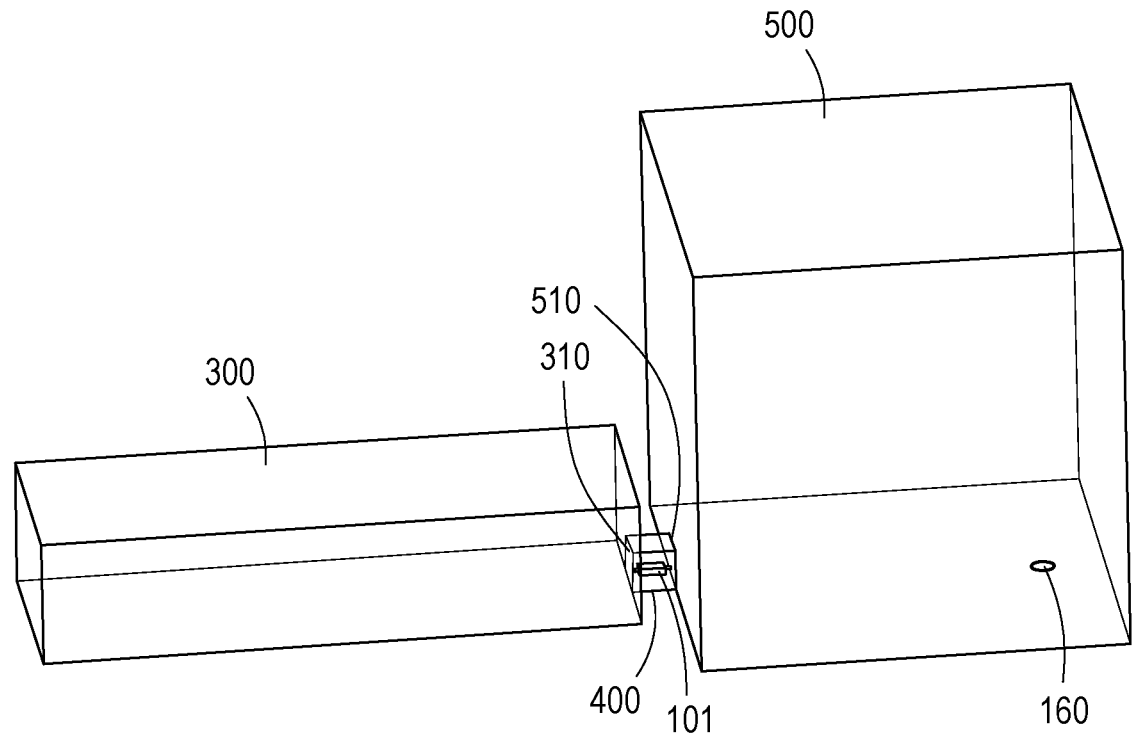
FIG. 7 is a schematic view of an assembly environment of a camera module according to an embodiment of the disclosure.

Referring to FIG. 3 and FIG. 7, in some embodiments, the initial camera module 101 shown in FIG. 3 has utilized the frame 105, the appearance component 150, and the waterproof adhesive layers 112, 140, and 170 to encapsulate the camera body 130 in the frame 105 and the appearance component 150. Under this configuration, external water and/or moisture may only enter the frame 105 through the first opening 122 and the second opening 154. Therefore, in this embodiment, the process of attaching the transparent cover 160 to the appearance component 150 to seal the second opening 154 is performed in a non-aqueous airtight cavity to prevent external water and/or moisture from entering the frame 105 during assembly, thus effectively avoiding the problem of water droplets or water marks inside the camera module.

In view of this, in this embodiment, after forming the initial camera module 101 as shown in FIG. 3, the initial camera module 101 may be placed in the non-aqueous airtight cavity first. A transparent cover 160 is attached to the appearance component 150 of the initial camera module 101 in the non-aqueous airtight cavity to engage the transparent cover 160 with in the framing portion 152 of the appearance component 150 and cover the lens 132. In this embodiment, the transparent cover 160 may include transparent materials such as glass, sapphire, or acrylic, but the disclosure is not limited thereto. In this embodiment, an environment of the non-aqueous airtight cavity includes a vacuum or nitrogen-filled. In other words, the non-aqueous airtight cavity may be vacuumed or filled with nitrogen to maintain the cavity in a state without moisture. In this way, it may be ensured that no water or moisture enters the camera module 100 during the assembly process of the camera module 100, thus avoiding the problems of water droplets or water marks in the camera module after the camera module 100 is installed.

Specifically, in this embodiment, an operation environment for attaching the transparent cover 160 to the appearance component 150 of the initial camera module 101 may include a first cavity 300, a second cavity 400, and a third cavity 500. The second cavity 400 is connected between the first cavity 300 and the third cavity 500, a gate 310 is set between the first cavity 300 and the second cavity 400, and a gate 510 is set between the second cavity 400 and the third cavity 500. In this embodiment, the third cavity 500 may be coupled with an environmental conditioning device to vacuumize or fill the third cavity 500 with nitrogen to maintain the cavity in a state without moisture. That is, the third cavity 500 may be regarded as the aforementioned non-aqueous airtight cavity.

With such a configuration, the method for attaching the transparent cover 160 to the appearance component 150 of the initial camera module 101 may be described below. First, the initial camera module 101 is placed in the first cavity 300. At this time, the gate 310 is in a closed state, and the environment of the first cavity 300 is a normal atmospheric environment. Next, the gate 310 is open and a transmission tool such as robotic arm is used to transmit the initial camera module 101 to the second cavity 400, and the gate 310 is close to prevent a large amount of moisture from the first cavity 300 from entering the second cavity 400. Then, the second cavity 400 is vacuumized or filled with nitrogen after being vacuumized, so that both the environment of the second cavity 400 and the third cavity 500 are airtight cavities without moisture, so as to avoid affecting the environment of the third cavity 500. After that, the gate 510 is opened, and then the initial camera module 101 is transmitted to the third cavity 500 by using a transmission tool such as a robotic arm, and the gate 510 is closed. The third cavity 500 is continuously vacuumized or filled with nitrogen, and the transparent cover 160 may be attached to the appearance component 150 of the initial camera module 101 in this non-aqueous airtight cavity.

Figure 8:
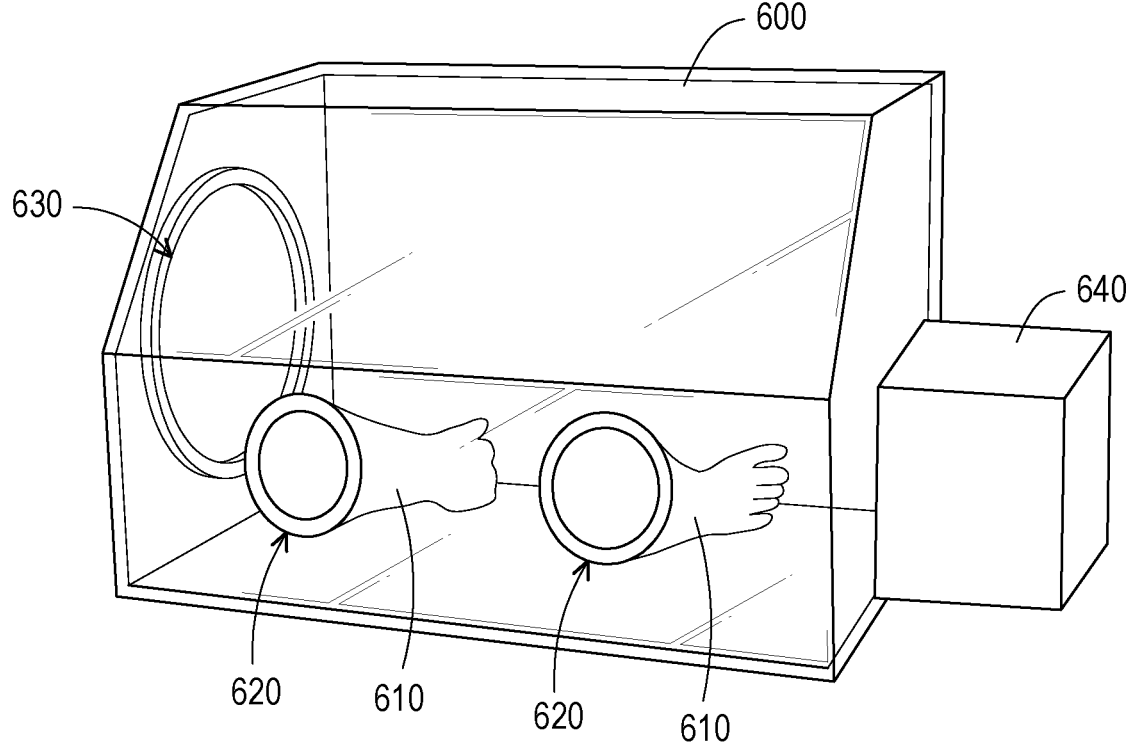
FIG. 8 is a schematic view of another assembly environment of a camera module according to an embodiment of the disclosure.

The foregoing embodiment is only one possible embodiment for attaching the transparent cover 160 in a non-aqueous airtight cavity in an automatic manner, and the disclosure is not limited thereto. Referring to FIG. 8, in other embodiments, attaching the transparent cover 160 may also be performed manually. Specifically, in this embodiment, the operation environment attaching the transparent cover 160 to the appearance component 150 of the initial camera module 101 may include a non-aqueous airtight cavity 600, which may include operating gloves 610, an operating port 620, a feed inlet 630, and an environmental conditioning device 640. In this embodiment, the amount of the operating port 620 may be two, for an operator's hands to reach in. The operating gloves 610 are sleeved onto the operating ports 620, so that the operator may wear the operating gloves 610 and assemble elements placed in the non-aqueous airtight cavity 600.

With such a configuration, the initial camera module 101 and the transparent cover 160 may be placed in the non-aqueous airtight cavity 600 by the feed inlet 630 first, and the environmental conditioning device 640 may be turned on to vacuumize the cavity or fill it with nitrogen, so as to maintain the non-aqueous airtight cavity 600 in a state without moisture. Afterwards, the operator's hands may be inserted through the operating ports 620 to put on the operating gloves 610 to attach the transparent cover 160 to the appearance component 150 of the initial camera module 101 in the non-aqueous airtight cavity 600.

To sum up, the camera module and the assembly method thereof of the disclosure use elements such as a frame, an appearance component, and a waterproof adhesive layer to encapsulate the camera body in the frame and the appearance component. Under this configuration, external water and/or moisture may only enter the frame through the opening of the frame configured to expose the lens, as well as through the opening of the appearance component. Subsequently, the transparent cover is attached to the appearance component to seal the opening that exposing the lens. Moreover, the process of attaching the transparent cover is performed in the non-aqueous airtight cavity to prevent external water and/or moisture from entering the frame during assembly, thus effectively avoiding the problem of water droplets or water marks inside the camera module. Therefore, the camera module and the assembly method thereof of the disclosure may effectively improve the yield and the performance of the camera module.

What is claimed is:

1. A camera module, comprising:
   a frame, comprising a first opening;
   a camera body, disposed in the frame and comprising a lens, wherein the first opening corresponds to and exposes the lens;
   an appearance component, disposed on the frame and comprising a second opening corresponding to and exposing the lens and a framing portion protruding from a top surface of the appearance component and framing the second opening; and
   a transparent cover, engaged with the framing portion and covering the lens, wherein the camera body comprises a connector, the frame comprises a connector opening corresponding to the connector, and the connector extends out of the frame through the connector opening.

2. The camera module according to claim 1, wherein the frame comprises a lower cover and an upper cover fixed to each other, the first opening is disposed on the upper cover, and the appearance component is attached to the upper cover.

3. The camera module according to claim 1, further comprising a waterproof adhesive layer, at least framing the lens to attach the frame to the camera body.

4. The camera module according to claim 1, further comprising a waterproof adhesive layer, framing the connector opening to fill a gap between the connector opening and the connector.

5. The camera module according to claim 1, further comprising a waterproof adhesive layer, disposed between the frame and the appearance component to attach the appearance component to the frame.

6. The camera module according to claim 1, further comprising a waterproof adhesive layer, filling a gap between the framing portion and the transparent cover to attach the transparent cover to the appearance component.

7. The camera module according to claim 1, wherein an amount of the lens is at least two, and amounts of the first opening and the second opening correspond to the amount of the lens respectively.

8. A method for assembling a camera module, comprising:

disposing a camera body in a frame, wherein the frame comprises a first opening corresponding to and exposing a lens of the camera body;

attaching an appearance component to the frame, wherein the appearance component comprises a second opening corresponding to and exposing the lens and a framing portion protruding from a top surface of the appearance component and framing the second opening to form an initial camera module;

placing the initial camera module in a non-aqueous airtight cavity; and attaching a transparent cover to the appearance component in the non-aqueous airtight cavity to engage the transparent cover with in the framing portion and cover the lens.

9. The method for assembling the camera module according to claim 8, wherein an environment of the non-aqueous airtight cavity comprises a vacuum or nitrogen-filled.

\* \* \* \* \*